United States Patent [19]

Takagi et al.

[11] 4,451,729

[45] May 29, 1984

[54] AUTOMATIC FOCUSING DEVICE AND LENS MOTOR CONTROL

[75] Inventors: Tadao Takagi, Yokohama; Nobuo Okabe, Tokyo, both of Japan

[73] Assignee: Nippon Kogaku K.K., Tokyo, Japan

[21] Appl. No.: 394,804

[22] Filed: Jul. 2, 1982

[30] Foreign Application Priority Data

Jul. 28, 1981 [JP] Japan ................ 56-117089

[51] Int. Cl.$^3$ .............................................. G01J 1/36
[52] U.S. Cl. .................................. 250/204; 354/403
[58] Field of Search ............... 250/201, 204, 209; 354/25 R, 25 A; 318/611, 55–57, 86–88

[56] References Cited

U.S. PATENT DOCUMENTS

| | | | |
|---|---|---|---|
| 4,107,520 | 8/1978 | Wilwerding | 250/204 |
| 4,307,294 | 12/1981 | Campbell | 250/201 |
| 4,382,665 | 5/1983 | Eguchi et al. | 250/201 |
| 4,385,817 | 5/1983 | Saito | 354/25 R |

*Primary Examiner*—David C. Nelms
*Attorney, Agent, or Firm*—Shapiro and Shapiro

[57] ABSTRACT

A device for automatically focusing an objective lens includes detecting means capable of detecting the positional relation of the objective lens with respect to an in-focus position at which an image of an object is formed on a predetermined focal plane, means including an electric motor and moving the objective lens toward the in-focus position by the motor, and means for controlling the driving of the motor in response to the detecting means. The control means includes a power supply circuit means for connecting the motor to a power source, a braking circuit means for short-circuiting the two terminals of the motor, and means for alternately operating the power supply circuit means and the braking circuit means to thereby decelerate the revolution of the motor when the objective lens is within a predetermined range near the in-focus position.

11 Claims, 5 Drawing Figures

AUTOMATIC FOCUSING DEVICE AND LENS MOTOR CONTROL

BACKGROUND OF THE INVENTION

1. Field of the Invention

This invention relates to an automatic focusing device, and more particularly to a so-called TTL type automatic focusing device which detects light passed through the phototaking lens of a single lens reflex camera, a TV camera or the like and effects focus detection.

2. Description of the Prior Art

In an automatic focusing device wherein a motor is rotated in response to a focus detection signal, whereby the phototaking lens is moved to its in-focus position, when the imaged position of an object to be photographed by the phototaking lens lies near a predetermined focal plane, it is desirable to decelerate the speed of movement of the phototaking lens is order to ensure that the phototaking lens is stopped when the imaged position has become coincident with the predetermined focal plane, namely, at the in-focus position of the lens. Particularly in the case of a TTL type automaic focusing device, such deceleration is requisite to enhance the in-focus accuracy.

SUMMARY OF THE INVENTION

It is an object of the present invention to provide an automatic focusing device in which the phototaking lens driving motor can be sufficiently decelerated near the in-focus position.

The device of the present invention includes detecting means capable of detecting the positional relation of a phototaking lens with respect to an in-focus position at which an image of an object is formed on a predetermined focal plane, means including an electric motor and moving the lens toward the in-focus position by the motor, and means for controlling the driving of the motor in response to the detecting means, the control means including a power supply circuit means for connecting the motor to a power source, a braking circuit means for short-circuiting the two terminals of the motor, and means for alternately operating the power supply circuit means and the braking circuit means to thereby decelerate the revolution of the motor when the lens is within a predetermined range near the in-focus position, whereby the speed of movement of the phototaking lens near the in-focus position can be sufficiently reduced.

The invention will become more fully apparent from the following detailed description thereof taken in conjunction with the accompanying drawings.

DESCRIPTION OF THE PREFERRED EMBODIMENTS

Figure 1:
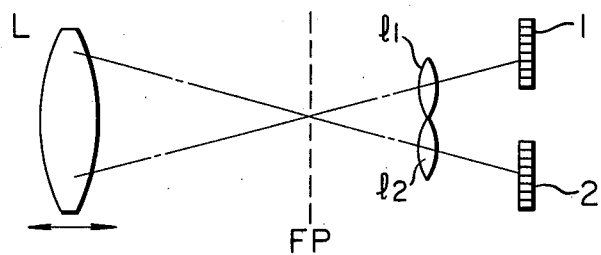
FIG. 1 shows the optical system an of automatic focus camera.

Referring to FIG. 1, there is shown an example of the optical system of the automatic focusing device according to the present invention.

A pair of first and second re-imaging lenses $l_1$ and $l_2$ are disposed rearwardly of the predetermined focal plane FP of a phototaking lens L, and these re-imaging lenses $l_1$ and $l_2$ image the light beams passed through the marginal portions of the phototaking lens L near corresponding first and second photoelectric element arrays 1 and 2. In such an optical system, as described in detail in Japanese Laid-open patent application No. 98710/1980 (U.S. application Ser. No. 112,350), the optical images on the first and second photoelectric element arrays 1 and 2 are displaced in the arrangement direction of the photoelectric elements substantially perpendicular to the optical axes of the re-imaging lenses $l_1$ and $l_2$ in accordance with the distance between an object to be photographed and the phototaking lens.

Figure 2:
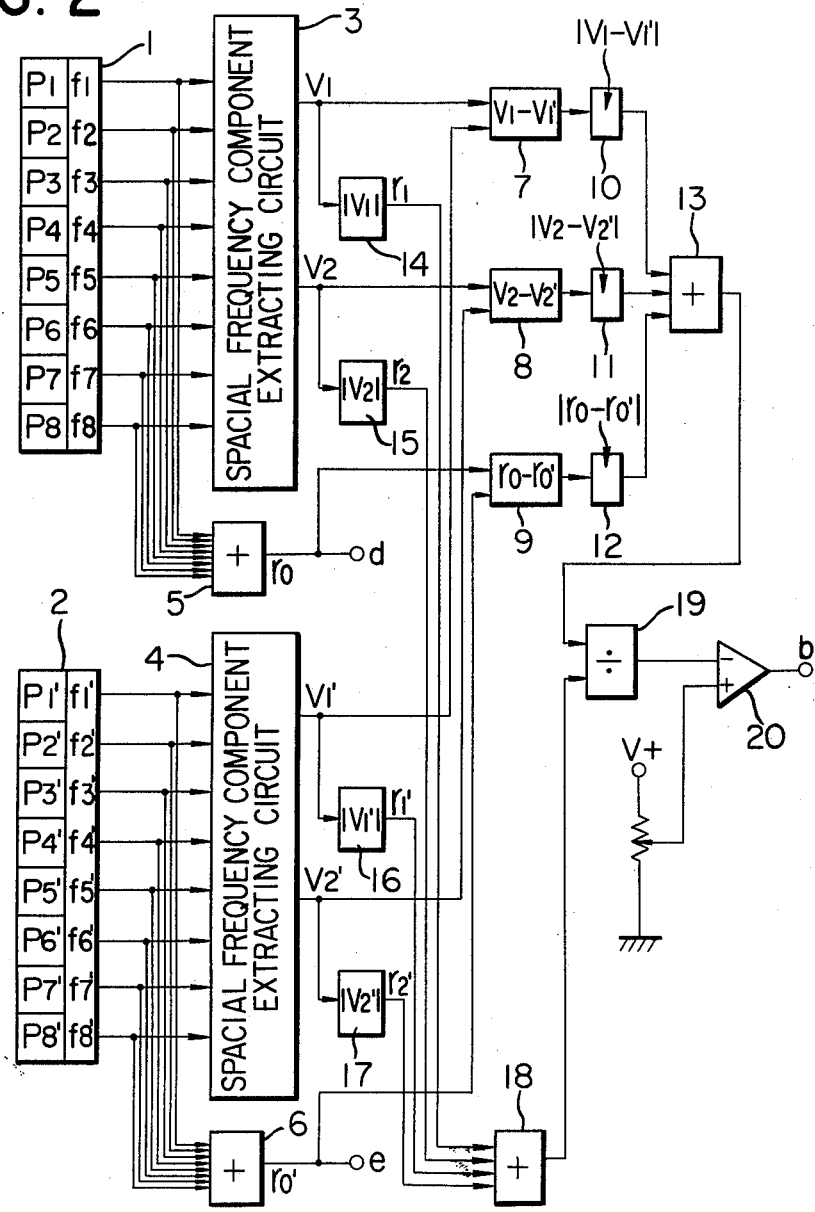
FIG. 2 shows the circuit of an embodiment of a correlation detecting means.

Referring now to FIG. 2, there is shown a correlation detecting means for detecting, from the outputs of the first and second photoelectric element arrays, whether the position of the object image by the phototaking lens lies within or outside a predetermined range near the predetermined focal plane.

Outputs $f_1$-$f_8$ related to the photoelectric output of the first photoelectric element array 1 and outputs $f_1'$-$f_8'$ related to the photoelectric output of the second photoelectric element array 2 are input to spatial frequency component extracting circuits 3 and 4, respectively. The circuit 3 puts out a first electrical signal $V_1$ containing much of information on the first spatial frequency component of the optical image on the first photoelectric element array 1 and a second electrical signal $V_2$ containing much of information on a second spatial frequency component different from the first spatial frequency, and the other circuit 4 likewise put out a first electrical signal $V_1'$ containing much of information on the first spatial frequency component of the optical image on the second photoelectric element array 2 and a second electrical signal $V_2'$ containing much of information on a second spatial frequency component. The details of such spatial frequency component extracting circuits are disclosed in the aforementioned Japanese Laid-open patent application No. 98710/1980.

The first electrical signals $V_1$ and $V_1'$ are vector amounts such as sine wave signals containing phase information $\phi_1$, $\phi_1'$ variable in a predetermined relation in accordance with the displacement of the optical images on the photoelectric element arrays in the arrangement direction of the photoelectric elements and information $r_1$, $r_1'$ representing the magnitudes of the extracted spatial frequency components thereof.

The second electrical signals $V_2$ and $V_2'$ are similarly vector amounts containing phase information $\phi_2$, $\phi_1'$ and magnitude information $r_2$, $r_2'$.

The related electrical outputs $f_1$-$f_8$ and $f_1'$-$f_8'$ are input to adder circuits 5 and 6, respectively, from which are put out scalar outputs $r_0$ and $r_0'$ representing the total quantity of incident light.

Subtraction circuits 7, 8 and 9 respectively calculates the difference between the first electrical signals $V_1$ and $V_1'$ representing the first spatial frequency components, the difference between the second electrical signals $V_2$ and $V_2'$ representing the second spatial frequency components, and the difference between the scalar outputs $r_0$ and $r_0'$. Circuits 10, 11 and 12 respectively detest the absolute values of the vector outputs $V_1-V_1'$ and $V_2-V_2'$ of the subtraction circuits 7 and 8, namely, the magnitudes $|V_1-V_1'|$ and $|V_2-V_2'|$ of the vectors thereof, and the absolute values $|r_0-r_0'|$ of the scalar output $r_0-r_0'$ of the subtraction circuit 9. An adder circuit 13 sums the outputs of the circuits 10, 11 and 12 and produces an output $|V_1-V_1'|+|V_2-V_2'|+|r_0-r_0'|$. Circuits 14, 15, 16 and 17 respectively detect the absolute values of the first and second electrical signals $V_1$, $V_1'$, $V_2$ and $V_2'$, namely, the magnitudes of vector $|V_1|=r_1$, $|V_2|=r_2$, $|V_1'|=r_1'$ and $|V_2'|=r_2'$. An adder circuit 18 sums the outputs $r_1$, $r_2$, $r_1'$ and $r_2'$ of the circuits 14–17.

The above-mentioned outputs $|V_1-V_1'|$, $|V_2-V_2'|$ and $|r_0-r_0'|$ and correlated with the imaged position of the object by the phototaking lens relative to the predetermined focal plane FP so that they become minimum (ideally zero) during in-focus and become greater as the in-focus is departed from. However, these correlated outputs are also dependent on the definition of the optical image on the photoelectric element.

The outputs $r_1$, $r_1'$, $r_2$ and $r_2'$, substantially similarly to the above-mentioned correlated outputs $|V_1-V_1'|,|V_2-V_2'|$ and $|r_0-r_0'|$, are dependent on the definition of the optical image. Accordingly, when, in a division circuit 19, the output of the adder circuit 13 is divided by the output of the adder circuit 18, namely, when the non-standardized correlated output $|V_1-V_1'|+|V_2-V_2'|+|r_0-r_0'|$ is divided by a standard factor $(r_1+r_2+r_1'+r_2')$, there is obtained an output which is substantially independent of the definition of the optical image. A comparison circuit 20 compares the output level of the division circuit 19 with a reference level, and puts out a high output when the output level of the division circuit 19 is smaller, namely, when the imaged position of the object lies within a predetermined range near the predetermined focal plane, and puts out a low output when the output level of the division circuit 19 is greater, namely, when the deviation from the focal plane is great.

In this manner, the above-described correlation detecting means produces an H-level output at the output terminal b of the comparison circuit 20 when the object image lies within a predetermined range near the focal plane, and produces an L-level output when the object image lies outside the predetermined range.

Description will now be made of focus detecting means for detecting whether the imaged position of the object by the phototaking lens L lies on the predetermined focal plane, or on the object side with respect to the predetermined focal plane (front focus), or on the side opposite from the object with respect to the predetermined focal plane (rear focus).

Figure 3:
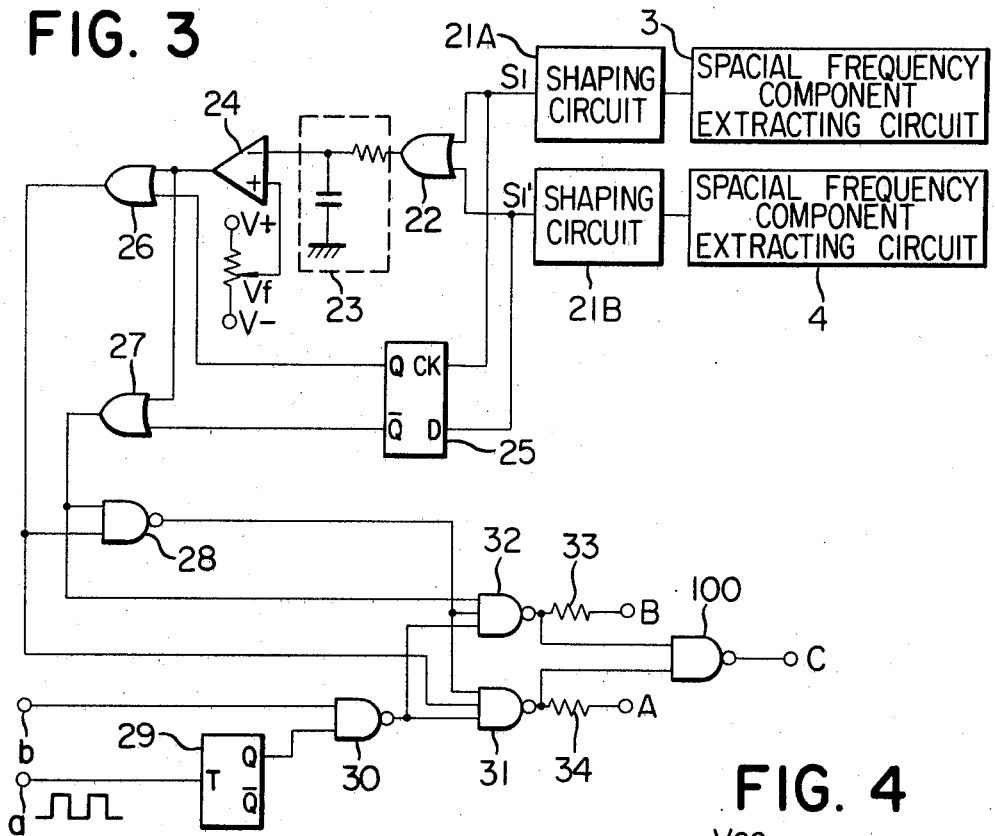
FIG. 3 shows the circuit of an embodiment of focus detecting means and a lens movement controlling means.

In FIG. 3, the sine wave signals $V_1$ and $V_1'$ of the same period from the spatial frequency component extracting circuits 3 and 4 are converted into rectangular waves $S_1$ and $S_1'$ by shaping circuits 21A and 21B, respectively. Of course, $V_2$ and $V_2'$ may be used instead of these sine wave signals $V_1$ and $V_1'$.

When the rectangular wave signal $S_1$ is more advanced in phase than the signal $S_1'$, it represents front focus; when the rectangular wave signal $S_1$ is later in phase than the signal $S_1'$, it represents rear focus; and when the two signals are substantially in phase with each other, it represents in-focus; and the absolute value of the phase difference between the two signals represents the bias amount from the in-focus. An OR gate 22 and a smoothing circuit 23 for smoothing the output of the OR gate 22 produce a DC output corresponding to the phase difference between the signals $S_1$ and $S_1'$. A comparator 24 compares this DC output level with a reference level $V_f$, and produces a high level output representing in-focus when the former is smaller than the latter. D-flip-flop 25 detects which of the signals S and S′ is more advanced in phase. Assuming that the flip-flop 25 latches the condition of the signal $S_1'$ to D input terminal at the rising of the signal $S_1$ to CK input terminal, the high level at Q output terminal represents front focus and the high level at $\overline{Q}$ output terminal represents rear focus. Accordingly, when the output level of the comparator 24 is high, namely, in the case of in-focus, the outputs of OR gates 26 and 27 assume a high level. Also, when the output level of the comparator 24 is low, namely, in the case of out-of-focus, the output level of the OR gate 26 remains high and the output level of the OR gate 27 drops to a low level if the condition is front focus condition. Conversely, in a case where the condition is out of focus and rear focus condition, the output level of the OR gate 26 drops to a low level and the output level of the OR gate remains high. Accordingly, the output signal of a NAND gate 28 which receives the outputs of the two OR gates 26 and 27 as input is put in NAND gates 31 and 32. The above-described circuits 3, 4, 21A, 21B and 22-28 together constitute focus detecting means which renders the output of the NAND gate 28 low when it detects in-focus, renders the output of the OR gate 26 high when it detects front focus, and renders the output of the OR gate 27 high when it detects rear focus.

T type flip-flop 29, NAND gates 30, 31, 32 and 100, and resistors 33 and 34 together constitute control means which controls the movement of the phototaking lens. The output of the correlation detecting means which assumes a high level near the in-focus and drops to a low level outside the in-focus is input to an input terminal b from the output terminal b of FIG. 2. A clock pulse is input to an input terminal a. The flip-flop 29 frequency-divides this clock pulse and produces an output of duty 50%.

The NAND gate 30 puts out a high level whenever the input terminal b is at a low level, and puts out a pulse of duty 50% comprising the inverted output of the flip-flop 29 when the input terminal b is at a high level.

Accordingly, in the case of in-focus, the terminal b is at a high level, the output of the NAND gate 28 becomes low, output terminals A and B are at a high level, the output of the NAND gate 100 becomes low and output terminal C is at a low level. In the case of out-of-focus, the output of the NAND gate 28 is always high level. If, at this time, the condition is front focus, the output of the OR gate 26 is high and therefore, a NAND gate 31 is selected and, when the image position lies near the focal plane, an intermittent pulse output comprising the inverted pulse of the Q output of the flip-flop 29 is produced at the output terminal A and, when the image position is spaced apart from the focal plane, the output terminal A drops to a low level. Also, in this case of front focus, the OR gate 27 is at a low level and therefore, the output of a NAND gate 32 is always high and put out to the output terminal B. Accordingly, when the image position lies near the focal plane, a pulse output comprising the inverted pulse of the pulse output of the output terminal A is produced at the output terminal C and, when the image position is spaced apart from the focal plane, the output terminal C becomes a high level.

In the case of rear focus, the output of the OR gate 27 is high and therefore, the NAND gate 32 is selected and, when the image position lies near the focal plane, the output terminal B puts out a pulse output and, when the image position is spaced apart from the focal plane, the output terminal B puts out a low level. At this time, when the image position lies near the focal plane, a pulse output comprising the inverted pulse of the pulse output of the output terminal B is produced at the output terminal C and, when the image position is spaced apart from the focal plane, the output terminal C becomes a high level.

Accordingly, an output signal of a NAND gate 100 which receives the output of the two output terminals A and B as input is put out as a brake signal C for a phototaking lens driving motor.

The above-described relations are summarized in the table 1 below.

TABLE 1

|  | In-focus | Front focus | | Rear focus | |
| --- | --- | --- | --- | --- | --- |
|  |  | near in-focus | not near in-focus | near in-focus | not near in-focus |
| Terminal A | High | Pulse | Low | High | High |
| Terminal B | High | High | High | Pulse | Low |
| Terminal C | Low | Pulse | High | Pulse | High |

Figure 4:
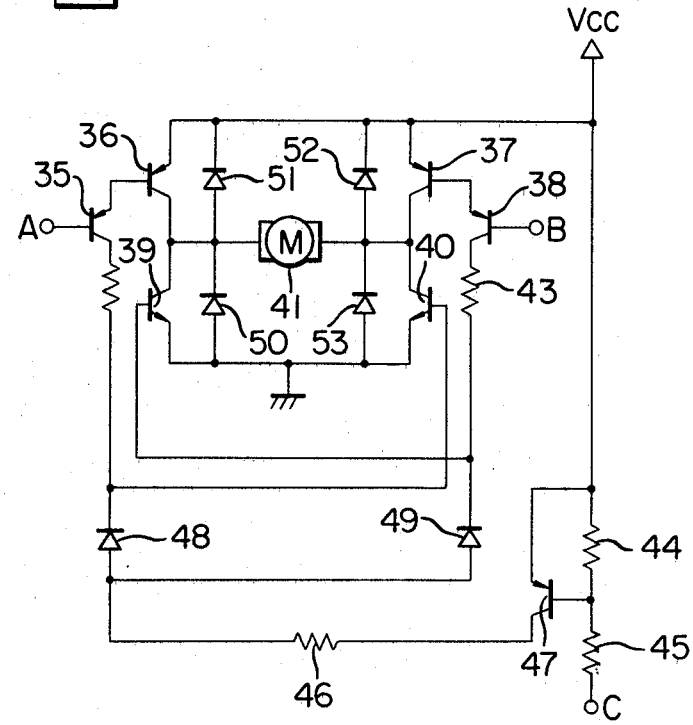
FIG. 4 shows an embodiment of a lens driving means.

FIG. 4 shows an embodiment of the motor driving circuit, which includes a motor 41, PNP transistors 35, 36, 38, 47, NPN transistros 39, 40, resistors 42, 43, 44, 45, 46 and diodes 48, 49, 50, 51, 52, 53.

Input terminals A, B and C are connected to the output terminals A, B and C, respectively, of FIG. 3.

When the condition is front focus and not near in-focus, the input terminal A drops to a low level and the input terminals B and C are at a high level and therefore, transistors 35, 36 and 40 are turned on to permit current to flow to the motor from left to right and the phototaking lens is continuously driven in a direction to be in-focus. When the condition remains to be front focus and yet comes near in-focus, namely, when a predetermined range near the in-focus position is reached, the input terminal A provides a pulse output and therefore, the input terminal C also provides a pulse output. During the low level section of the pulse output of the input terminal C, the transistor 47 is turned on and the transistors 39 and 40 are turned on through the resistor 46 and diodes 48, 49, and the motor 41 is short-circuited through the transistors 39 and 40 and a brake is exerted thereon by a counter electromotive force. Accordingly, the motor is alternately driven and braked and slows down sufficiently to bring the lens close to the in-focus point.

When in-focus is attained, the input terminals A and B assume high level and the transistors 35, 36, 37 and 38 are turned off. The input terminal C assumes low level, the transistor 47 is turned on, the transistors 39 and 40 are turned on through the resistor 46 and diodes 48, 49, the motor 41 is short-circuited through the transistors 39 and 40 and is suddenly stopped by a brake being exerted thereon by a counter electromotive force.

Conversely, when the condition is rear focus and not near in-focus, the input terminal B falls to low level and the input terminals A and C are at high level and therefore, the transistors 37, 38 and 39 are turned on and electric current flows through the motor from right to left and the lens is continuously driven toward the in-focus point in a direction opposite to that in case of front focus. When the condition remains to be rear focus and yet comes near in-focus, a pulse signal is applied to the input terminal B and therefore, as previously described, the motor is intermittently driven and braked and slows down to brings the lens close to the in-focus point.

When in-focus is attained, as previously described, the input terminals A and B assume high level and the input terminal C assumes low level and thus, a brake is exerted on the motor, which is suddenly stopped thereby.

Diodes 50–53 are used to relieve the electromotive force produced by the motor being rotated when focus adjustment is effected by manually rotating the distance ring of the phototaking lens.

The NAND gate 100 of FIG. 3 may be incorporated in the motor driving circuit of FIG. 4.

Figure 5:
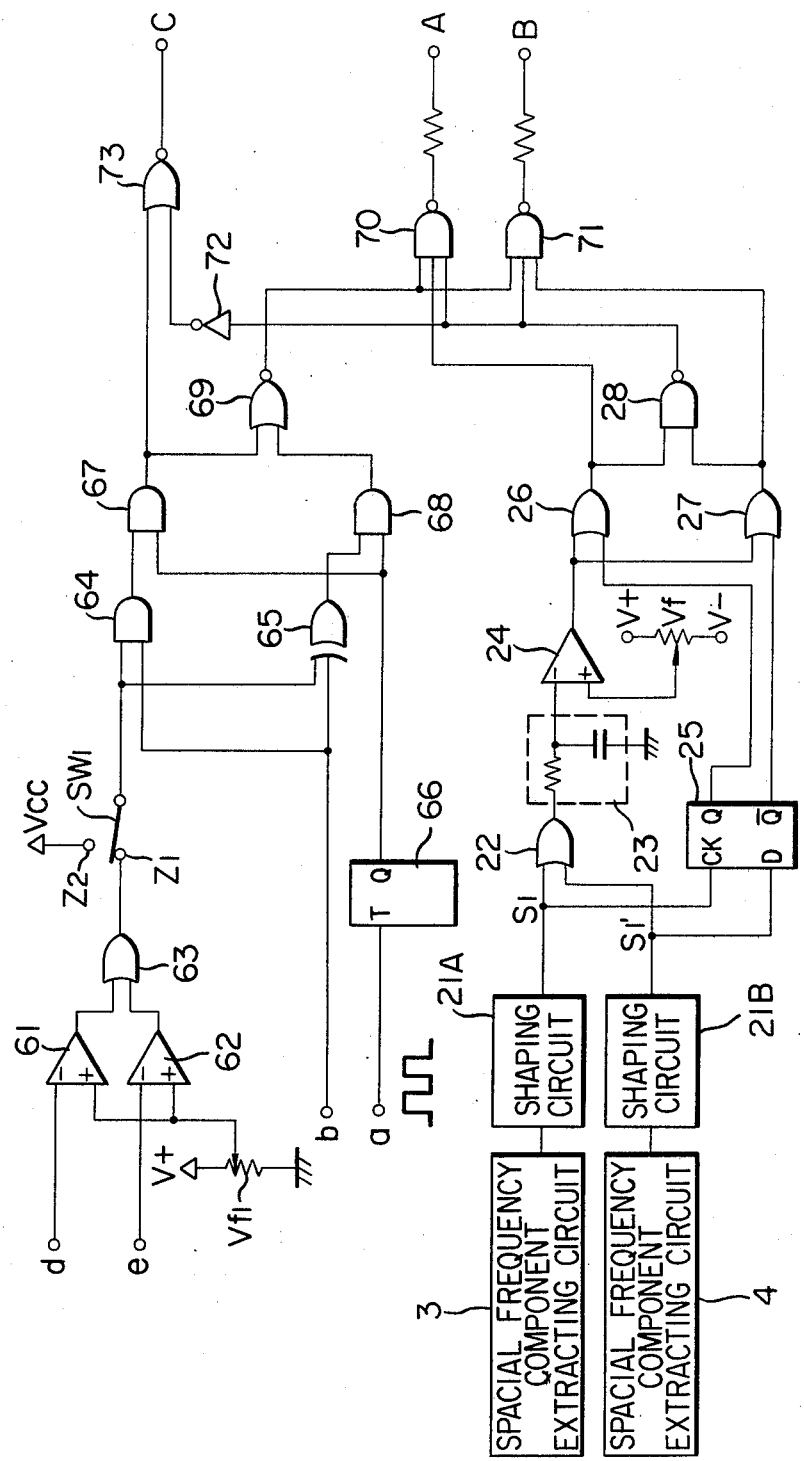
FIG. 5 is a circuit diagram showing the focus detecting means and lens movement controlling means according to another embodiment of the present invention.

FIG. 5 shows another embodiment of the present invention, in which there is provided for producing, in addition to a near in-focus signal and a not near in-focus signal, a high brightness signal or a low brightness signal depending on the brightness of the object to be photographed, and for generating a signal which drives the phototaking lens at a high speed in case of not near in-focus and high brightness, at a medium speed in case of not near in-focus and low brightness and in case of near in-focus and high brightness, and at a low speed in case of near in-focus and low brightness.

In FIG. 5, components identical to those in FIG. 3 are given identical reference characters. That is, the components up to the OR gates 26, 27 and NAND gate 28 in FIG. 5 are similar to those in FIG. 3.

Scalar outputs ro and ro' representative of the total quantities of light of the object images on the photoelectric element arrays 1 and 2 of the in-focus detecting device shown in FIG. 1 are applied as inputs to input terminals d and e, respectively. Comparators 61 and 62 compare these signals with a reference voltage $V_{fl}$ and apply Hi output to an OR gate 63 when the scalar outputs ro and ro' are lower than the voltage $V_{fl}$, and apply Lo output to the OR gate 63 when the scalar outputs ro and ro' are higher than the voltage $V_{fl}$. Accordingly, the OR gate 63 provides Hi output when either or both of the scalar outputs ro and ro' are lower than the reference voltage $V_{fl}$, namely, when the object image has become dark, and provides Lo output during the other time, namely, when the object image is light. A Hi level signal within a predetermined in-focus range or a Lo level signal outside a predetermined in-focus range is applied as input to a terminal b. The signal of this terminal b and the output of the OR gate 63 are applied to an AND gate 64, which produces a Hi level signal when said two signals are Hi, namely, when the condition is near in-focus and the object image is dark, and generates a Lo level signal during the other time.

Also, the signal of the terminal b and the output of the OR gate 63 are applied to an exclusive OR gate 65, which provides a high level output when said two signals differ from each other, namely, when the condition is not near in-focus and the object image is dark or when the condition is near in-focus and the object image is light, and provides a low level output during the other time. Also, a clock pulse is applied as input to a terminal a and this pulse is shaped into a duty 50% pulse by T-flip-flop 66.

When the condition is near in-focus and the object image is dark, the AND gate 64 applies a high level output to an AND gate 67, which thus produces the pulse of T-flip-flop 66. On the other hand, when the condition is not near in-focus and the object image is dark or when the condition is near in-focus and the object image is light, the exclusive OR gate 65 applies a high level output to an AND gate 68, which thus produces the pulse of T-flip-flop 66. Accordingly, a NOR gate 69 which receives inputs from the AND gates 67 and 68 produces a high level output when the condition is not near in-focus and the object image is light, and generates a duty 50% pulse during the other time.

Now consider a case where the phototaking lens is at front focus position. In this case, the OR gate 26 produces a high level output and the OR gate 27 produces a low level output and therefore, the NAND gate 28 generates a high level output. Accordingly, a NAND gate 70 which receives inputs from the NOR gate 69, the OR gate 26 and the NAND gate 28, inverts the output of the NOR gate 69 and transmits it to the output terminal A. Also, at this time, the OR gate 27 is at low level and therefore, a NAND gate 71 which receives input from the OR gate 27 provides a high level output, which is transmitted to the output terminal B. The NAND gate 28 a high level and therefore, an inverter 72 produces a low level output, whereby a NOR gate 73 elects the AND gate 67 and produces its negation. Accordingly, in this case, the NOR gate 73 produces a duty 50% pulse when the condition is near in-focus and the object image is dark, and a high level during the other time. This output is transmitted to the output terminal C.

When the phototaking lens is at its rear focus position, the OR gate 26 produces a low level output and the OR gate 27 generates a high level output and therefore, the NAND gate 28 produces a high level output. Accordingly, the OR gate 26 is at low level and therefore, the output of the NAND gate 70 which receives as input the output of the OR gate 26 becomes high and this is transmitted to the output terminal A. Also, the negation of the output of the NOR gate 69 is produced by the NAND gate 71 which receives as inputs the outputs of the NOR gate 69, the OR gate 27 and the NAND gate 28, and this is transmitted to the output terminal B. The NAND gate 28 assumes a high level and so, the inverter 72 produces a low level output, whereby the NOR gate 73 selects the AND gate 67 and produces the negation thereof.

Accordingly, in this case, the NAND gate 73 produces a duty 50% pulse when the condition is near in-focus and the object image is dark, and provides a high level output during the other time. This output is transmitted to the output terminal C.

When in-focus is attained, the outputs of the OR gates 26 and 27 both become high. Accordingly, the NAND gate 28 produces a low level output and the inverter 72 negates it and applies it as input to the NOR gate 73, which thus produces a low level output and transmits it to the output terminal C.

The relations between the outputs of the above-described terminals A, B and C will be shown in Table 2 below.

TABLE 2

|   |       | front focus | | in-focus | rear focus | |
|---|-------|-------------|-|----------|------------|-|
|   |       | not near in-focus | near in-focus | | | not near in-focus |
| A | Light | Low   | Pulse | High  | High  | High  |
|   | Dark  | Pulse | Pulse | High  | High  | High  |
| B | Light | High  | High  | High  | Pulse | Low   |
|   | Dark  | High  | High  | High  | Pulse | Pulse |
| C | Light | High  | High  | Low   | High  | High  |
|   | Dark  | High  | Pulse | Low   | Pulse | High  |

When a manual change-over operating switch $SW_1$ connected between the OR gate 63 and the AND gate 64 is changed over so that its contact piece contacts a contact $Z_2$, the output of the OR gate 63 based on the scalar outputs ro and ro' representative of the total quantities of light of the object images which are applied to the terminals d and e is interrupted and therefore, in-focus speed control can be effected independently of the brightness of the object to be photographed.

The output terminals A, B and C of FIG. 5 are connected to the input terminals A, B and C, respectively, of FIG. 4. The driving speed of the motor in this case is controlled in three stages, namely, high speed, medium speed and low speed, as shown in Table 3 below. That is, when the object to be photographed is light and the condition is not near in-focus, the input terminal A or B is at low level and the input terminal C is at high level and therefore, the motor is driven at high speed. When the object to be photographed is light and the condition is near in-focus and when the object to be photographed is dark and the condition is not near in-focus, a pulse enters the input terminal A or B and the input terminal C is at high level and therefore, the short-circuiting circuit of the motor is not formed and accordingly, there is obtained medium speed driving. When the object to be photographed is dark and the condition is near in-focus, a pulse enters the input terminal A or B and the input terminal C and therefore, the circuit of FIG. 4 repeats the power supply to the motor and the formation of the short-circuiting circuit in synchronism with the pulse, whereby there is obtained low speed driving.

TABLE 3

|  | not near in-focus | near in-focus | in-focus |
|---|---|---|---|
| When the object is light | High speed | Medium speed | Stopped |
| When the object is dark | Medium speed | Low speed | Stopped |

The constructions of the focus detecting means and the correlation detecting means of the present invention are not restricted to the illustrated embodiment, but the former means may be of any construction if it can detect in-focus, front focus and rear focus and the latter means may be of any construction if it can detect whether the condition is within or outside the vicinity of in-focus position.

We claim:

1. A device for automatically focusing an objective lens, comprising:
   (a) detecting means capable of detecting the positional relation of said objective lens with respect to an in-focus position at which an image of an object is formed on a predetermined focal plane;

(b) means including an electric motor for moving said objective lens toward said in-focus position; and (c) control means for controlling the driving of said motor in response to said detecting means, said control means including a power supply circuit means adapted, when operative, for connecting said motor to a power source, a braking circuit means adapted, when operative, for short-circuiting said motor, means for rendering said power supply circuit means operative continuously when said image is far from said focal plane, and means for alternately rendering said power supply circuit means and said braking circuit means operative when said image is close to said focal plane to thereby decelerate said motor when said objective lens is within a predetermined range near said in-focus position.

2. The device according to claim 1, wherein said control means includes means for rendering said braking circuit means operative continuously when said objective lens is at said in-focus position.

3. The device according to claim 1, wherein said detecting means includes means for detecting the amount of deviation of the image of said object from said predetermined focal plane and producing a pulsating signal when said image is within a predetermined distance range from said focal plane, and wherein during deceleration of said motor said power supply circuit means and said braking circuit means are rendered operative alternately in synchronism with said pulsating signal.

4. The device according to claim 1, further comprising another detecting means for detecting the brightness of said object and wherein said control means further includes means responsive to said another detecting means to modify the speed of said motor in accordance with the brightness of said object.

5. In an automatic focusing device for an objective lens and in which the device includes means for detecting the deviation of the position of the lens from an in-focus position and means including an electric motor responsive to said detecting means for driving the lens toward the in-focus position, and including means for generating a pulsating signal for controlling the operation of the electric motor as the lens approaches the in-focus position, the improvement comprising:

(a) power supply means;

(b) first circuit means for connecting said power supply means to said electric motor to supply electric power to said electric motor, said first circuit means having first switching means adapted to be rendered conductive by the pulses of said pulsating signal; and (c) second circuit means for short-circuiting said electric motor to generate a counter electromotive force in said electric motor, said second circuit means having second switching means adapted to be rendered conductive during the intervals between said pulses.

6. The improvement according to claim 5, further comprising means for rendering said first switching means conductive continuously and said second switching means non-conductive continuously when said objective lens is far from its in-focus position.

7. The improvement according to claim 5, further comprising means for rendering said first switching means non-conductive continuously and said second switching means conductive continuously when said lens reaches its in-focus position.

8. The improvement according to claim 5, further comprising means for rendering said second switching means non-conductive while said first switching means is rendered conductive.

9. The improvement according to claim 5, wherein said signal generating means produces pulses separated by intervals of duration the same as that of said pulses.

10. The improvement according to claim 5, further comprising means responsive to the brightness of an object for varying the speed of said electric motor, the last-mentioned means comprising means for rendering said first switching means conductive continuously and said second switching means non-conductive continuously when the brightness of the object is above a predetermined value and said lens is far from said in-focus position.

11. The improvement according to claim 10, wherein said varying means comprises means for rendering said first switching means conductive and non-conductive repetitively in response to said pulsating signal and means for rendering said second switching means non-conductive continuously when the brightness of said object is below said predetermined value.

* * * * *